US011960902B2

(12) United States Patent
Zhang

(10) Patent No.: US 11,960,902 B2
(45) Date of Patent: Apr. 16, 2024

(54) CHIP BOOTING CONTROL METHOD, CHIP, AND DISPLAY PANEL

(71) Applicant: Chipone Technology (Beijing) Co., LTD., Beijing (CN)

(72) Inventor: Lida Zhang, Beijing (CN)

(73) Assignee: Chipone Technology (Beijing) Co., LTD., Beijing (CN)

( * ) Notice: Subject to any disclaimer, the term of this patent is extended or adjusted under 35 U.S.C. 154(b) by 22 days.

(21) Appl. No.: 17/890,379

(22) Filed: Aug. 18, 2022

(65) Prior Publication Data
US 2023/0025728 A1 Jan. 26, 2023

Related U.S. Application Data

(63) Continuation of application No. PCT/CN2021/091039, filed on Apr. 29, 2021.

(30) Foreign Application Priority Data

Jun. 19, 2020 (CN) .......................... 202010566789.2

(51) Int. Cl.
G06F 9/4401 (2018.01)
G06F 9/445 (2018.01)
(Continued)

(52) U.S. Cl.
CPC ............ G06F 9/4408 (2013.01); G06F 9/445 (2013.01); H04L 63/0838 (2013.01);
(Continued)

(58) Field of Classification Search
CPC .... G06F 21/575; G06F 9/4401; G06F 9/4406; G06F 9/4403; G06F 21/51; G06F 9/445; G06F 9/4408; G06F 21/64; G06F 21/44
(Continued)

(56) References Cited

U.S. PATENT DOCUMENTS

2007/0118880 A1* 5/2007 Mauro, II ............... G06F 21/79
726/4
2007/0174602 A1 7/2007 Kao
(Continued)

FOREIGN PATENT DOCUMENTS

CN 105843641 A 8/2016
CN 111722878 A 9/2020
(Continued)

OTHER PUBLICATIONS

Chinese International Search Report, Jul. 26, 2021 (4 pages).

Primary Examiner — Ji H Bae
(74) Attorney, Agent, or Firm — Occhiuti & Rohlicek LLP

(57) ABSTRACT

The present disclosure relates to a chip booting control method, a chip, a display panel, and an electronic apparatus. The method is applied to a control circuit of a chip, and the chip further includes a buffer. The method includes: reading first booting information from the buffer in response to a chip triggering non-power-down reset, the first booting information being used to boot the chip; determining whether the first booting information satisfies a first preset condition; and booting the chip according to the first booting information in response to the first booting information satisfying the first preset condition.

13 Claims, 4 Drawing Sheets

(51) Int. Cl.
*G06F 21/44* (2013.01)
*G06F 21/51* (2013.01)
*G06F 21/57* (2013.01)
*G06F 21/64* (2013.01)
*H04L 9/40* (2022.01)

(52) U.S. Cl.
CPC .......... *G06F 9/4401* (2013.01); *G06F 9/4403* (2013.01); *G06F 9/4406* (2013.01); *G06F 21/44* (2013.01); *G06F 21/51* (2013.01); *G06F 21/575* (2013.01); *G06F 21/64* (2013.01)

(58) Field of Classification Search
USPC ............................... 713/1, 2; 714/48; 726/22

See application file for complete search history.

(56) References Cited

U.S. PATENT DOCUMENTS

| | | | |
|---|---|---|---|
| 2008/0040598 A1* | 2/2008 | Lee .................. | G06F 9/441 |
| | | | 713/2 |
| 2011/0016270 A1 | 1/2011 | Yeh | |
| 2012/0096251 A1* | 4/2012 | Aloni ................ | G06F 9/4401 |
| | | | 713/2 |
| 2014/0078046 A1* | 3/2014 | Seo .................. | G06F 1/1652 |
| | | | 345/156 |
| 2017/0097898 A1* | 4/2017 | Durham ............. | G06F 12/1408 |
| 2017/0185781 A1 | 6/2017 | Kim | |
| 2017/0249002 A1* | 8/2017 | Costa ................ | G06F 21/575 |
| 2020/0210205 A1* | 7/2020 | Govindarajan ...... | H04L 45/54 |
| 2021/0240831 A1* | 8/2021 | Oncale .............. | G06F 8/65 |

FOREIGN PATENT DOCUMENTS

| | | |
|---|---|---|
| JP | 2002185549 A | 6/2002 |
| JP | 2015141500 A | 8/2015 |

* cited by examiner

CHIP BOOTING CONTROL METHOD, CHIP, AND DISPLAY PANEL

This present application is a continuation of and claims priority under 35 U.S.C. § 120 to PCT Application. No. PCT/CN2021/091039 filed on Apr. 29, 2021, which claims priority to Chinese Patent Application No. 202010566789.2 filed on Jun. 19, 2020, and entitled "CHIP ENABLE CONTROL METHOD, CHIP, DISPLAY PANEL, AND ELECTRONIC DEVICE". All the above referenced priority documents are incorporated herein by reference.

TECHNICAL FIELD

The present disclosure relates to the field of chip technology, and in particular, to a chip booting control method, a chip, a display panel, and an electronic apparatus.

BACKGROUND

As chip technology continues to evolve, various kinds of specialized chips have become more widely applied in various fields of social lift, especially in the field of communication, and their functions are more and more powerful as well. When applying a chip, the chip is first initialized in order to make the chip work normally, and the initialization process may include loading a program of the chip and configuring parameters in the chip, etc.

Typically, a series of parameters need to be configured upon chip booting to ensure that the chip can function normally. The existing chip booting flow is as follows: after chip power-on booting or chip reset is completed, a firmware saved in a flash memory is loaded into a static random access memory (SRAM), and if there is no flash memory, a firmware is loaded from an external control unit.

However, in the case where the chip does not undergo power-down reset, e.g., the chip is reset through a chip reset pin or triggering a watchdog reset, the existing chip booting process will still load the firmware saved in the flash memory into the static random access memory (SRAM), which results a longer chip booting time.

SUMMARY

In view of this, the present disclosure provides a chip booting control method, the method being applied to a control circuit of a chip, the chip further comprising a buffer, the method comprising: reading first booting information for booting the chip from the buffer in response to the chip triggering non-power-down reset; determining whether the first booting information satisfies a first preset condition; and booting the chip based on the first booting information in response to the first booting information satisfying the first preset condition.

In a possible implementation, determining whether the first booting information satisfies the first preset condition comprises: determining whether the first booting information has an enabling flag; determining whether a length of the first booting information is greater than a preset threshold value in response to the first booting information having the enabling flag; determining a verification result corresponding to the first booting information in response to the length of the first booting information being greater than the preset threshold value; determining whether the verification result is the same as a pre-stored verification code in the buffer; and determining that the first booting information satisfies the first preset condition in response to the verification result being the same as the pre-stored verification code in the buffer.

In a possible implementation, determining the verification result corresponding to the first booting information comprises: determining, based on the first booting information, the verification result corresponding to the first booting information by a cyclic redundancy check algorithm or a parity check algorithm.

In a possible implementation, the method further comprising: loading second booting information for chip booting into the buffer in response to the first booting information not satisfying the first preset condition.

In a possible implementation, the method further comprising: after the chip is booted, altering or erasing the pre-stored verification code stored in the buffer based on a second preset condition.

According to another aspect of the present disclosure, there is provided a chip comprising a control circuit and a buffer, wherein the control circuit is configured to: read first booting information for booting the chip from the buffer in response to the chip triggering non-power-down reset; determine whether the first booting information satisfies a first preset condition; and boot the chip based on the first booting information in response to the first booting information satisfying the first preset condition, and the buffer is configured to buffer the first booting information.

In a possible implementation, the control circuit determining whether the first booting information satisfies the first preset condition comprises: determining whether the first booting information has an enabling flag; determining whether a length of the first booting information is greater than a preset threshold value in response to the first booting information having the enabling flag; determining a verification result corresponding to the first booting information in response to the length of the first booting information being greater than the preset threshold value; determining whether the verification result is the same as a pre-stored verification code in the buffer; and determining that the first booting information satisfies the first preset condition in response to the verification result being the same as the pre-stored verification code in the buffer.

In a possible implementation, the control circuit determining the verification result corresponding to the first booting information comprises: determining, based on the first booting information, the verification result corresponding to the first booting information by a cyclic redundancy check algorithm or a parity check algorithm.

In a possible implementation, the chip further comprising a storage module, the control circuit is further configured to: load second booting information for chip booting in the storage module into the buffer in response to the first booting information not satisfying the first preset condition.

In a possible implementation, the control circuit is further configured to: after the chip is booted, alter or erase the pre-stored verification code stored in the buffer based on a second preset condition.

According to another aspect of the present disclosure, there is provided a display panel, comprising a display component and the above chip.

In a possible implementation, the display component comprises at least one of a liquid crystal display component, a light emitting diode display component, or an organic light emitting diode display component.

According to another aspect of the present disclosure, there is provided an electronic apparatus comprising the above display panel.

The chip booting control method of an embodiment of the present disclosure is capable of booting the chip according to a first booting information when the first booting information satisfies a first preset condition in case of non-power-down reset, thus eliminating the time for reloading codes for chip booting to a buffer, and saving the time for chip booting.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate exemplary embodiments, features, and aspects of the present disclosure and, together with the description, serve to explain the principles of the disclosure.

DETAILED DESCRIPTION

Figure 1:
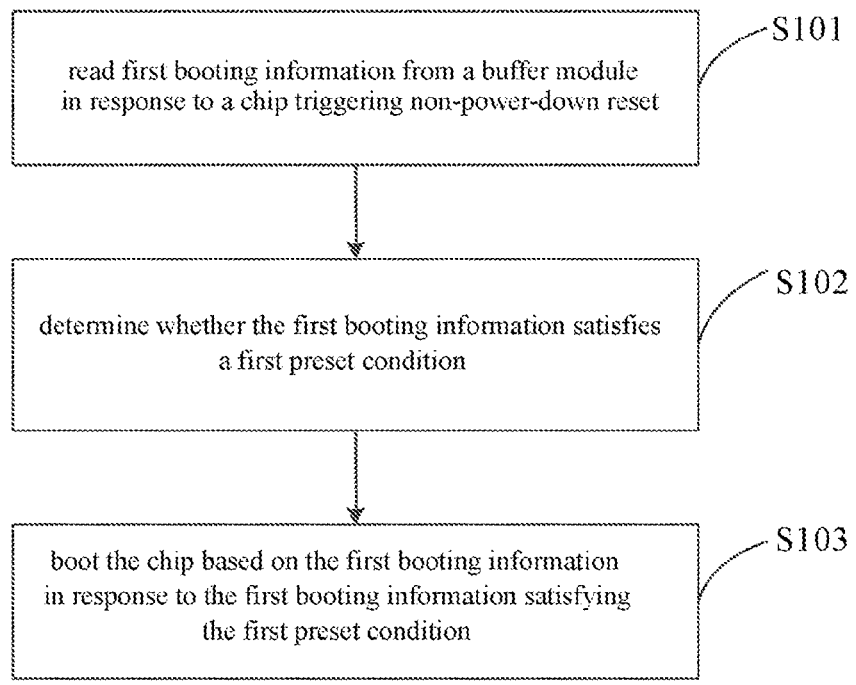
FIG. 1 shows a schematic flowchart of a chip booting control method implemented in accordance with the present disclosure.

Various exemplary embodiments, features, and aspects of the present disclosure will be described in detail below with reference to the drawings. The same reference numerals in the drawings denote elements having the same or similar functions. Although various aspects of the embodiments are shown in the drawings, the drawings are not necessarily drawn to scale unless otherwise specified.

The special word "exemplary" herein means "serving as an example, embodiment, or illustration". Any embodiment described herein as "exemplary" need not be interpreted as superior to or better than other embodiments.

In addition, numerous specific details are given in the following detailed embodiments for the purpose of better describing the present disclosure. It should be understood by a person skilled in the art that the present disclosure can also be realized without certain specific details. In some examples, methods, means, elements, and circuits well known to a person skilled in the art are not described in detail in order to highlight the gist of the present disclosure.

In a possible implementation, a chip of an embodiment of the present disclosure may comprise a touch chip, which may be applied to a touch terminal. It should be noted that embodiments of the present disclosure do not limit the type of the chip.

In a possible implementation, a chip of an embodiment of the present disclosure may comprise a control module and a buffer module. The control module may comprise a central processing unit (CPU), a micro controller unit (MCU), a digital signal processor (DSP), or the like. It should be noted that embodiments of the present disclosure do not limit the type of the control module.

In a possible implementation, the buffer module of the embodiment of the present disclosure may comprise a memory. The memory may include a random access memory (RAM), which may store information to a designated unit and read information from the designated unit, and a read only memory (ROM), which may fixedly store data.

Illustratively, taking the random access memory which may include a static random access memory (SRAM) and a dynamic random access memory (DRAM) as an example, the buffer module of the embodiment of the present disclosure may include a static random access memory (SRAM). It should be noted that embodiments of the present disclosure do not limit the type of the buffer module.

FIG. 1 shows a schematic flowchart of a chip booting control method according to an embodiment of the present disclosure. The chip booting control method implemented in accordance with the present disclosure may be applied to a control module of the chip. As shown in FIG. 1, the method comprises:

in step S101, reading first booting information from the buffer module in response to the chip triggering non-power-down reset;

in step S102, determining whether the first booting information satisfies a first preset condition; and in step S103, booting the chip according to the first booting information in response to the first booting information satisfying the first preset condition.

Exemplarily, a firmware (codes) saved in a storage module (e.g., a flash memory) or an external control unit may be pre-stored into the buffer module at chip booting or power-down reset; and the codes for chip booting pre-stored in the buffer module may not be lost or corrupted when the chip triggers non-power-down reset, for example, through a chip reset pin or triggering a watchdog reset.

In a possible implementation, in step S101, first booting information is read from the buffer module in response to the chip triggering non-power-down reset. The first booting information is used to boot the chip.

Exemplarily, the first booting information may include codes required for chip booting; the first booting information may include binary codes; and the type and form of the first booting information is not limited by embodiments of the present disclosure. When the chip triggers non-power-down reset, the booting information may not be lost or corrupted, in which case the first booting information currently buffered in the buffer module may be checked.

In a possible implementation, in step S102, the first preset condition comprises whether the first booting information has an enabling flag, whether a length of the first booting information is greater than a preset threshold value, and whether a check result (verification result) corresponding to the first booting information is the same as a pre-stored check code (verification code) in the buffer module.

The enabling flag may include a binary sequence. Exemplarily, taking an enabling flag of 0001 as an example, if the first four bits of the first booting information are 0001, the first booting information may be deemed as having an enabling flag. It should be noted that embodiments of the present disclosure do not limit the specific value of the enabling flag and the position of the enabling flag in the code.

The pre-stored check code is used to indicate check information (verification information) of first booting information loaded in the buffer module. In practical applications, codes for chip booting are often fixed, and the check code corresponding to the codes for chip booting is fixed as well, so that the check code corresponding to the codes for chip booting can be stored as a pre-stored check code in the buffer module.

In a possible implementation, in step S103, in a case where the first booting information satisfies the first preset condition, the booting information currently buffered in the buffer module can be deemed intact, and the chip can be booted directly without reloading the booting information into the buffer module.

According to embodiments of the present disclosure, the chip can be booted according to booting information in the buffer module when the booting information satisfies a preset condition in a case of non-power-down reset, which eliminates the time for reloading the booting information to the buffer module and improves the speed of chip booting.

In a possible implementation, after step S102, the method of an embodiment of the present disclosure further comprises:

loading second booting information for chip booting into the buffer module in response to the first booting information not satisfying the first preset condition.

Exemplarily, the second booting information may be stored in a storage module. The storage module may include a non-volatile storage medium, for example, a flash memory (FLASH), an EEPROM (Electrically Erasable Programmable Read Only Memory), a MRAM (Magnetic Random Access Memory), or a FeRAM (Fe Random Access Memory). Embodiments of the present disclosure do not limit the type of the storage module.

After the chip is powered down, data stored in the storage module would not be lost, and thus the second booting information for chip booting can be stored in the storage module. The second booting information is used to boot the chip, and may include correct codes for chip booting, and when the first booting information satisfies the first preset condition, contents contained in the first booting information and the second booting information are the same.

In a case where the first booting information does not satisfy the first preset condition, the booting information pre-stored in the buffer module may be deemed missing or corrupted, then the second booting information stored in the storage module may be loaded into the buffer module, such that the chip is booted normally.

Loading the correct codes for chip booting into the buffer module in a case where the booting information does not satisfy the first preset condition allows ensuring normal booting of the chip even when the booting information is corrupted or lost, which improves fault tolerance of the method of embodiments of the present disclosure.

In a possible implementation, after step S103, the method of an embodiment of the present disclosure further comprises:

altering or erasing the pre-stored check code stored in the buffer module according to a second preset condition, after the chip is booted.

Exemplarily, the second preset condition may include altering the pre-stored check code stored in the buffer module on a preset period, or erasing the pre-stored check code stored in the buffer module at one-time, according to user requirements.

Figure 2:
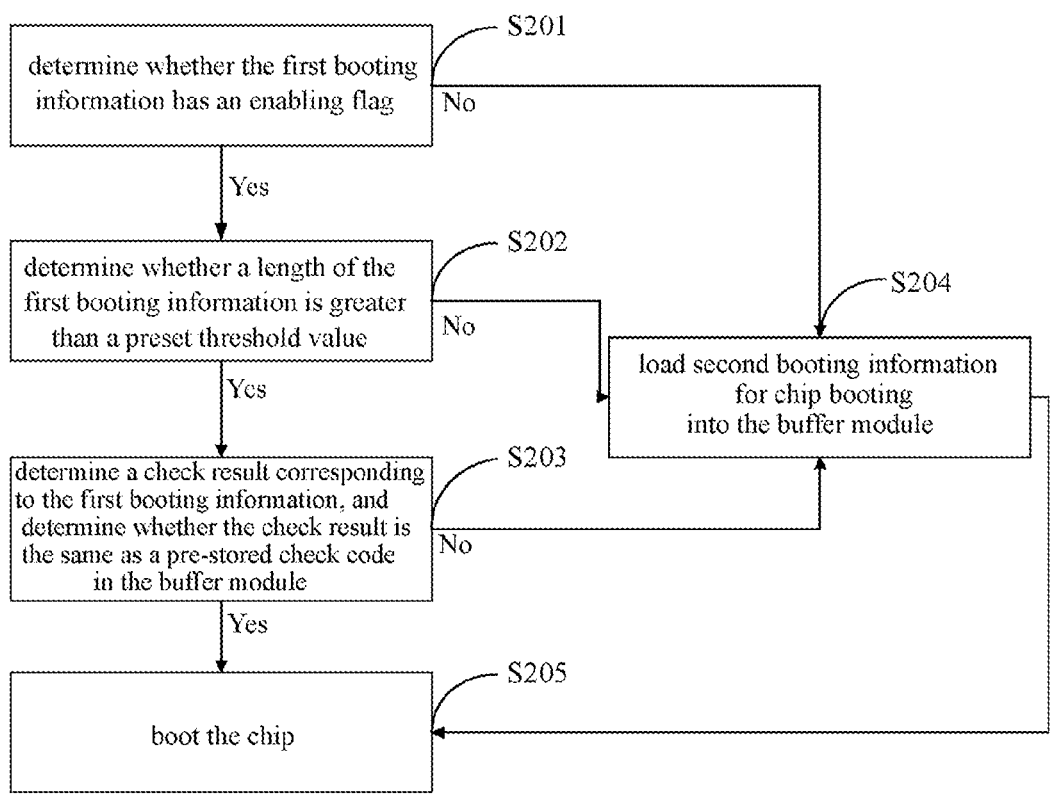
FIG. 2 shows a schematic flowchart of a method for booting a chip according to first booting information implemented in accordance with the present disclosure.

FIG. 2 shows a schematic flowchart of a method for booting a chip according to first booting information implemented in accordance with the present disclosure. As shown in FIG. 2, the method for booting a chip according to first booting information comprises:

in step S201, determining whether the first booting information has an enabling flag; if so, executing step S202, and if not, executing step S204;

in step S202, determining whether a length of the first booting information is greater than a preset threshold value; if so, executing step S203, and if not, executing step S204;

in step S203, determining a check result corresponding to the first booting information, and determining whether the check result is the same as a pre-stored check code in the buffer module; if so, executing step S205, and if not, executing step S204;

in step S204, loading second booting information for chip booting into the buffer module; and in step S205, booting the chip.

Exemplarily, by determining whether the first booting information has an enabling flag and determining whether the length of the first booting information is greater than a preset threshold value, it can be determined whether the first booting information is severely corrupted in a case where the chip trigger non-power-down reset and, if so, reloading the correct codes for chip booting is required.

The specific value of the preset threshold value may be set according to user requirements. Exemplarily, the preset threshold value may be zero, and the present embodiment is not limited thereto.

By comparing the check result corresponding to the first booting information actually read from the buffer module with the pre-stored check code in the buffer module, it can be determined whether the first booting information actually read from the buffer module is the correct codes for chip booting. It should be noted that the first booting information and the pre-stored check code may be stored in different positions in the buffer module, and that the first booting information and the pre-stored check code may be in different forms.

By determining whether the first booting information satisfies the first preset condition through multiple conditions, accuracy of the first booting information for chip booting can be guaranteed.

In a possible implementation, in step S203, determining the check result corresponding to the first booting information comprises:

determining, according to the first booting information, a check result corresponding to the first booting information by a cyclic redundancy check algorithm or a parity check algorithm.

Exemplarily, taking the first booting information of 1101011011 as an example, determining, by the cyclic redundancy check algorithm, the check result corresponding to the first booting information may comprise: performing a division operation of dividing the first booting information with a predetermined divisor (e.g., 10011); determining a remainder corresponding to the division operation; complementing the remainder after the data of the first booting information; and using a result of complementing the remainder after the data of the first booting as a check result corresponding to the first booting information.

Exemplarily, the parity check algorithm may include odd check and even check. Taking the first booting information of 00011010 as an example, the odd check may complement 0 after the data of the first booting information, then the check result corresponding to the first booting information is 000110100, and the number of is in the check result is odd (3); the even check may complement 1 after the data of the first booting information, then the check result corresponding to the first booting information is 000110101, and the number of is in the check result is even (4).

The check result corresponding to the first booting information is determined through the parity check algorithm, whether the check result is the same as the pre-stored check code in the buffer module can be determined by determining whether the number of 1s in the check result is the same as the number of 1s in the pre-stored check code.

The chip booting control method of an embodiment of the present disclosure is capable of booting the chip according to codes for chip booting pre-stored in the buffer module when the check code satisfies the first preset condition in a case of non-power-down reset, which eliminates the time for reloading the codes for chip booting to the buffer module and saves the time for chip booting. After the chip is booted, the check code stored in the buffer module can be altered or erased according to user requirements, so as to meet personalized needs of the user.

Figure 3:
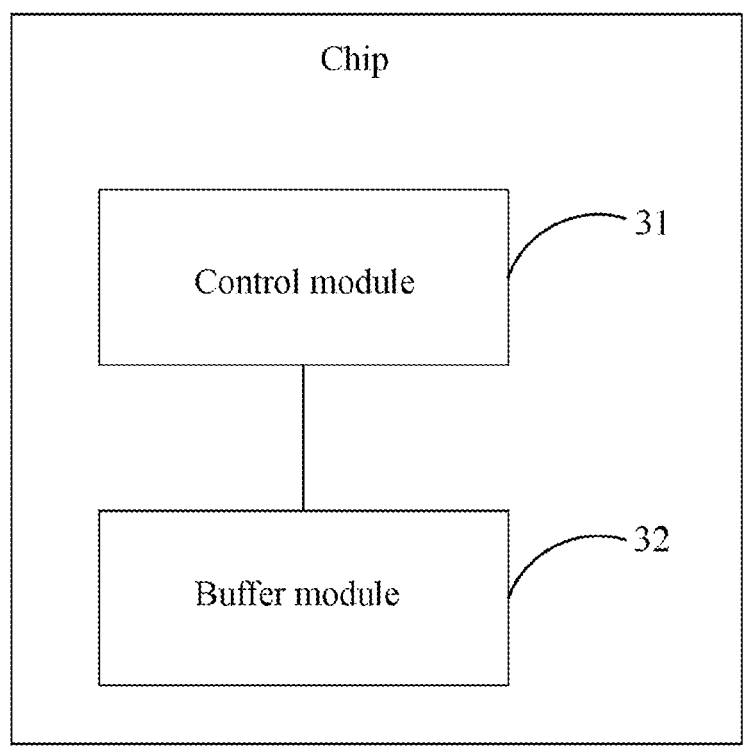
FIG. 3 shows a schematic diagram of device structure of a chip implemented in accordance with the present disclosure.

FIG. 3 shows a schematic diagram of device structure of a chip implemented in accordance with the present disclosure. As shown in FIG. 3, the device may comprise:

a control module 31 configured to read first booting information from the buffer module 32 in response to the chip triggering non-power-down reset, wherein the first booting information is used to boot the chip; determine whether the first booting information satisfies a first preset condition; and boot the chip according to the first booting information in response to the first booting information satisfying the first preset condition; and a buffer module 32 configured to buffer the first booting information.

In a possible implementation, the control module 31 determining whether the first booting information satisfies a first preset condition comprises:

the control module 31 determining whether the first booting information has an enabling flag;

determining whether a length of the first booting information is greater than a preset threshold value in response to the first booting information having the enabling flag;

determining a check result corresponding to the first booting information in response to the length of the first booting information being greater than the preset threshold value;

determining whether the check result is the same as a pre-stored check code in the buffer module 32; and determining that the first booting information satisfies the first preset condition in response to the check result being the same as the pre-stored check code in the buffer module 32.

In a possible implementation, the control module 31 determining the check result corresponding to the first booting information comprises:

determining, according to the first booting information, a check result corresponding to the first booting information by a cyclic redundancy check algorithm or a parity check algorithm.

In a possible implementation, the chip further comprises a storage module, and the control module 31 is further configured to:

load second booting information for chip booting in the storage module into the buffer module 32 in response to the first booting information not satisfying the first preset condition.

In a possible implementation, the control module 31 is further configured to:

alter or erase the pre-stored check code stored in the buffer module 32 according to the second preset condition, after the chip is booted.

Figure 4:
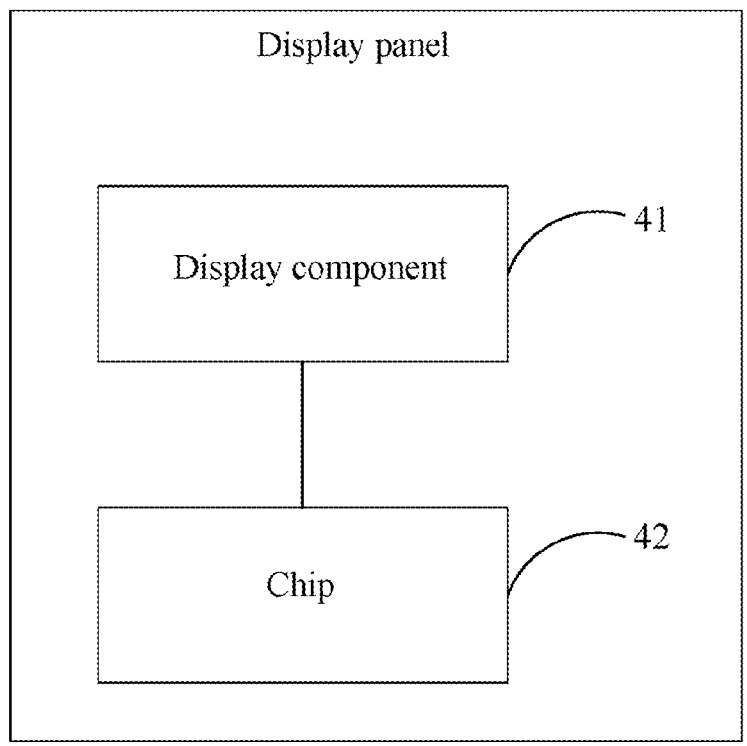
FIG. 4 shows a structural schematic diagram of a display panel implemented in accordance with the present disclosure.

FIG. 4 shows a structural schematic diagram of a display panel implemented in accordance with the present disclosure. As shown in FIG. 4, the display panel may comprise:

a display component 41; and a chip 42 in the corresponding embodiment as shown in FIG. 3.

In a possible implementation, the display component 41 comprises at least one of a liquid crystal display component, a light emitting diode display component, or an OLED (Organic Light Emitting Diode) display component.

In a possible implementation, the display component 41 may comprise a liquid crystal display (LCD) and a touch panel (TP). If the display component 41 comprises a touch panel, the display component 41 may be implemented as a touch screen to receive input signals from a user. The touch panel includes one or more touch sensors to sense touch, swipes, and gestures on the touch panel. The touch sensor may not only sense the boundary of a touch or swipe action, but also detect the duration and pressure associated with the touch or swipe operation.

Figure 5:
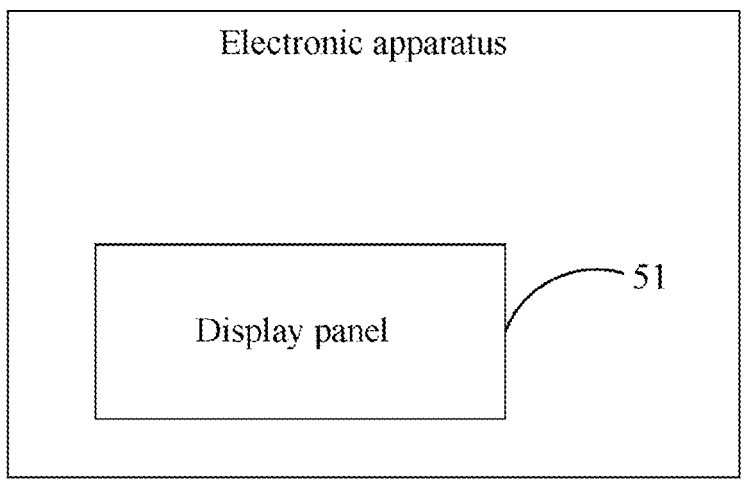
FIG. 5 shows a structural schematic diagram of an electronic apparatus implemented in accordance with the present disclosure.

FIG. 5 shows a structural schematic diagram of an electronic apparatus implemented in accordance with the present disclosure. As shown in FIG. 5, the electronic apparatus may comprise:

the display panel in the corresponding embodiment as shown in FIG. 4.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages. The programming languages include an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider),In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart can be implemented by dedicated hardware-based systems performing the specified functions or acts, or by combinations of dedicated hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A chip booting control method, the method being applied to a control circuit of a chip, the chip further comprising a buffer, the method comprising:
    reading first booting information for booting the chip from the buffer in response to the chip triggering non-power-down reset;
    determining whether the first booting information satisfies a first preset condition; and
    booting the chip based on the first booting information in response to the first booting information satisfying the first preset condition,
    wherein determining whether the first booting information satisfies the first preset condition comprises:
        determining whether the first booting information has an enabling flag;
        determining whether a length of the first booting information is greater than a preset threshold value in response to the first booting information having the enabling flag;
        determining a verification result corresponding to the first booting information in response to the length of the first booting information being greater than the preset threshold value;
        determining whether the verification result is the same as a pre-stored verification code in the buffer; and
        determining that the first booting information satisfies the first preset condition in response to the verification result being the same as the pre-stored verification code in the buffer.

2. The method according to claim 1, wherein determining the verification result corresponding to the first booting information comprises:
    determining, based on the first booting information, the verification result corresponding to the first booting information by a cyclic redundancy check algorithm or a parity check algorithm.

3. The method according to claim 1, further comprising:
loading second booting information for chip booting into the buffer in response to the first booting information not satisfying the first preset condition.

4. The method according to claim 1, further comprising:
after the chip is booted, altering or erasing the pre-stored verification code stored in the buffer based on a second preset condition.

5. A chip comprising a control circuit and a buffer, wherein the control circuit is configured to:
read first booting information for booting the chip from the buffer in response to the chip triggering non-power-down reset;
determine whether the first booting information satisfies a first preset condition; and
boot the chip based on the first booting information in response to the first booting information satisfying the first preset condition, and
the buffer is configured to buffer the first booting information,
wherein the control circuit determining whether the first booting information satisfies the first preset condition comprises:
determining whether the first booting information has an enabling flag;
determining whether a length of the first booting information is greater than a preset threshold value in response to the first booting information having the enabling flag;
determining a verification result corresponding to the first booting information in response to the length of the first booting information being greater than the preset threshold value;
determining whether the verification result is the same as a pre-stored verification code in the buffer; and
determining that the first booting information satisfies the first preset condition in response to the verification result being the same as the pre-stored verification code in the buffer.

6. The chip according to claim 5, wherein the control circuit determining the verification result corresponding to the first booting information comprises:
determining, based on the first booting information, the verification result corresponding to the first booting information by a cyclic redundancy check algorithm or a parity check algorithm.

7. The chip according to claim 5, further comprising a storage module, the control circuit is further configured to:
load second booting information for chip booting in the storage module into the buffer in response to the first booting information not satisfying the first preset condition.

8. The chip according to claim 5, wherein the control circuit is further configured to:
after the chip is booted, alter or erase the pre-stored verification code stored in the buffer based on a second preset condition.

9. A display panel comprising:
a display component; and
a chip comprising a control circuit and a buffer, wherein the control circuit is configured to:
read first booting information for booting the chip from the buffer in response to the chip triggering non-power-down reset;
determine whether the first booting information satisfies a first preset condition; and
boot the chip based on the first booting information in response to the first booting information satisfying the first preset condition, and
the buffer is configured to buffer the first booting information,
wherein the control circuit determining whether the first booting information satisfies the first preset condition comprises:
determining whether the first booting information has an enabling flag;
determining whether a length of the first booting information is greater than a preset threshold value in response to the first booting information having the enabling flag;
determining a verification result corresponding to the first booting information in response to the length of the first booting information being greater than the preset threshold value;
determining whether the verification result is the same as a pre-stored verification code in the buffer; and
determining that the first booting information satisfies the first preset condition in response to the verification result being the same as the pre-stored verification code in the buffer.

10. The display panel according to claim 9, wherein the control circuit determining the verification result corresponding to the first booting information comprises:
determining, based on the first booting information, the verification result corresponding to the first booting information by a cyclic redundancy check algorithm or a parity check algorithm.

11. The display panel according to claim 9, wherein the chip further comprising a storage module, the control circuit is further configured to:
load second booting information for chip booting in the storage module into the buffer in response to the first booting information not satisfying the first preset condition.

12. The display panel according to claim 9, wherein the control circuit is further configured to:
after the chip is booted, alter or erase the pre-stored verification code stored in the buffer based on a second preset condition.

13. The display panel according to claim 9, wherein the display component comprises at least one of a liquid crystal display component, a light emitting diode display component, or an organic light emitting diode display component.

* * * * *